(No Model.)
J. H. MASON.
ELECTRIC BATTERY.
No. 501,151. Patented July 11, 1893.
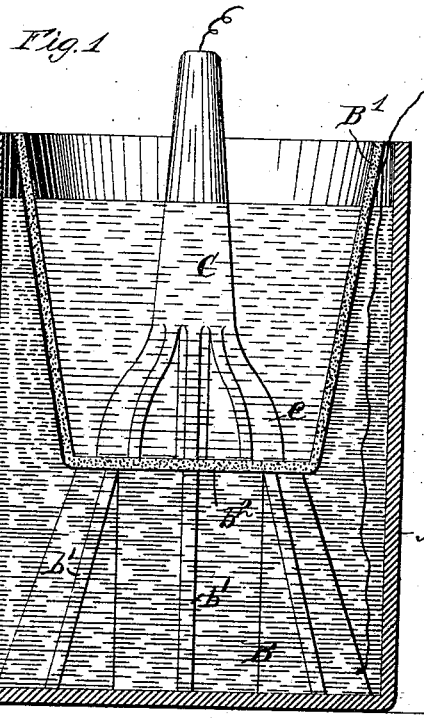
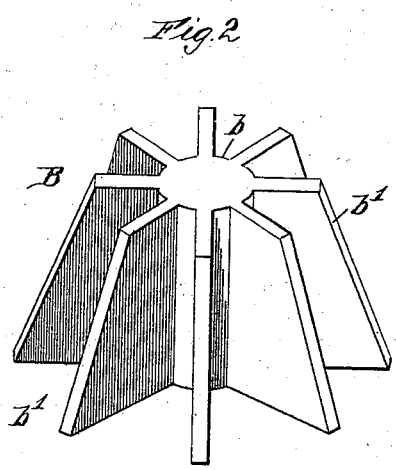
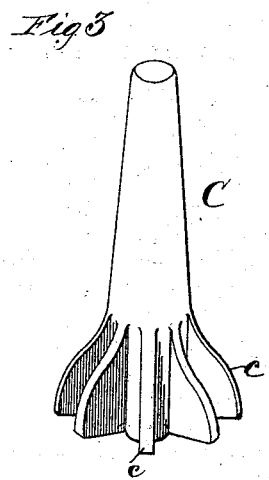
Witnesses
V. T. Wilson
Louis Dubois
Inventor
James H. Mason
By his Attorney
W. L. Rennew

United States Patent Office.

JAMES H. MASON, OF BROOKLYN, NEW YORK, ASSIGNOR, BY MESNE ASSIGNMENTS, TO THE MASON ELECTRIC COMPANY, OF EAST ORANGE, NEW JERSEY.

ELECTRIC BATTERY.

SPECIFICATION forming part of Letters Patent No. 501,151, dated July 11, 1893.

Application filed November 14, 1892. Serial No. 451,854. (No model.)

*To all whom it may concern:*

Be it known that I, JAMES H. MASON, of Brooklyn, county of Kings, and State of New York, have invented a new and useful Improvement in Electric Batteries, of which the following is a specification.

This invention relates to batteries, termed "double fluid batteries," and the object is to provide a battery with very low internal resistance, and in which the lighter or zinc solution is supported over the heavier or carbon solution in such manner that the two solutions do not mix.

In the accompanying drawings, Figure 1, is a vertical section of a battery embodying my improvement. Fig. 2, is a perspective view of a carbon element employed. Fig. 3, is a perspective view of a zinc element employed.

Referring by letter to the drawings, A, designates the battery cell, consisting of any suitable material, such as hard rubber, glass, or similar material.

B, designates the carbon element adapted to rest on the bottom of the cell A, as shown, and it is designed to support a cup B', within the cell A. The carbon element consists, as here shown, of a central post $b$, and wings $b'$, which radiate from the post $b$. The wings $b'$, at their outer edges, are inclined inward from bottom to top. The cup B', has a porous bottom $b^2$, but its side wall is rendered non-porous by any suitable means, such as glazing or painting.

C, is the zinc element adapted to rest on the bottom of the cup B'. At its lower end the zinc element has radial wings $c$, which form a broad base for it to stand upon.

The cell A, is designed to be filled with a heavy solution, such as a depolarizing solution, and the cup B', is designed to be filled with the usual acid solution.

By suspending the acid solution in the cup B', having a porous bottom only, in the depolaring solution, the diffusion of the depolarizer is very limited.

Having described my invention, what I claim is—

In an electric battery, the combination with a cell of a carbon element, having the central post and radial portions, a cup having a porous bottom and supported by the carbon element, and the zinc element supported on the bottom of said cup, substantially as specified.

JAMES H. MASON.

Witnesses:
  W. L. BENNEM,
  J. W. SHERWOOD.